US012767475B2

(12) United States Patent
Murshed et al.

(10) Patent No.: US 12,767,475 B2
(45) Date of Patent: Oct. 20, 2026

(54) ROLL TO ROLL MACHINE AND METHODS OF GAGE REPEATABILITY AND REPRODUCIBILITY

(71) Applicant: GM GLOBAL TECHNOLOGY OPERATIONS LLC, Detroit, MI (US)

(72) Inventors: Mahboob Murshed, Commerce Township, MI (US); Ashley Margaret Bickel, Southfield, MI (US)

(73) Assignee: GM GLOBAL TECHONOLGY OPERATIONS LLC, Detroit, MI (US)

( * ) Notice: Subject to any disclaimer, the term of this patent is extended or adjusted under 35 U.S.C. 154(b) by 57 days.

(21) Appl. No.: 18/987,332

(22) Filed: Dec. 19, 2024

(65) Prior Publication Data

US 2026/0176096 A1 Jun. 25, 2026

(51) Int. Cl.

| | |
|---|---|
| ***B65H 23/18*** | (2006.01) |
| ***B65H 16/02*** | (2006.01) |
| ***B65H 18/08*** | (2006.01) |
| ***H01M 10/04*** | (2006.01) |

(52) U.S. Cl.

CPC ......... *B65H 23/1806* (2013.01); *B65H 16/02* (2013.01); *B65H 18/08* (2013.01); *H01M 10/0404* (2013.01)

(58) Field of Classification Search

CPC .... B65H 23/1806; B65H 16/02; B65H 18/08; H01M 10/0404

See application file for complete search history.

(56) References Cited

U.S. PATENT DOCUMENTS

| | | | | |
|---|---|---|---|---|
| 6,276,586 | B1 * | 8/2001 | Yeo | B65H 23/038 271/227 |
| 6,311,539 | B1 * | 11/2001 | Yeo | B65H 23/0204 250/252.1 |
| 6,637,634 | B1 * | 10/2003 | Yeo | B65H 23/038 226/42 |
| 2020/0104664 | A1 * | 4/2020 | Feiten | G06K 7/10 |

FOREIGN PATENT DOCUMENTS

| | | | | |
|---|---|---|---|---|
| DE | 69903903 T2 | 8/2003 | | |
| EP | 4520695 A1 | 3/2025 | | |
| WO | WO-2024055678 A1 * | 3/2024 | | B65H 19/2215 |

* cited by examiner

*Primary Examiner* — Sang K Kim

(74) *Attorney, Agent, or Firm* — Ingrassia Fisher & Lorenz, LLP | IFL

(57) ABSTRACT

Disclosed is a method of testing and/or operating a roll to roll machine including a floating unwinder and edge position sensor attached thereto, and a floating rewinder having an edge position sensor attached thereto.

20 Claims, 10 Drawing Sheets

ROLL TO ROLL MACHINE AND METHODS OF GAGE REPEATABILITY AND REPRODUCIBILITY

INTRODUCTION

The technical field generally relates to roll to roll machines and methods of repeatability and reproducibility.

A substrate may be moved from an unwinder roll to a rewinder roll of a roll to roll machine in a variety of processes may be performed on the substrate as the substrate moves from the unwinder roll to a rewinder roll.

Accordingly, it is desirable to provide a roll to roll machine and a method of testing and/or operating a roll to roll machine that allows for gage repeatability and reproducibility using the roll to roll machine. Furthermore, other desirable features and characteristics of the patentable variations will become apparent from the subsequent detailed description and the appended claims, taken in conjunction with the accompanying drawings and the foregoing introduction.

SUMMARY

A number of variations may include a method including: (a) moving a substrate having a plurality of sample locations identified on the substrate in a first longitudinal direction so that each sample location of the plurality of sample locations moves past a sensor; (b) holding the sensor in a constant position relative to a first side edge and a second side edge of the substrate as the plurality of sample locations moves past the sensor; (c) using the sensor to collect data regarding a property of the substrate at each sample location; (d) moving the substrate having the plurality of sample locations identified on the substrate in a second longitudinal direction opposite the first longitudinal direction so that each sample location of the plurality of sample locations move back past the sensor; and (e) repeating acts (a-d).

A number of variations may include a method wherein the plurality of sample locations includes at least five sample locations.

A number of variations may include a method wherein repeating acts (a-d) a plurality of times includes repeating acts (a-d) eight times to collect fifty data regarding the property of the substrate.

A number of variations may include a method wherein the sensor is constructed and arranged to measure a thickness of the substrate.

A number of variations may include a method wherein the substrate includes a battery electrode material.

A number of variations may include a method wherein each sample location of the plurality of sample locations is identified by spaced apart pieces of tape or marks.

A number of variations may include a method further including moving the substrate laterally as the substrate is moving the substrate in the first longitudinal direction.

A number of variations may include a method wherein the battery electrode material includes a metal foil.

A number of variations may include a method including: providing a roll to roll machine including a floating unwinder including a unwinder drum and a unwinder linear actuator for moving the unwinder drum in a first lateral direction and a second lateral direction, an unwinder motor coupled to the unwinder drum to rotate the unwinder drum in a first rotational direction and a second rotational direction opposite the first rotational direction, a substrate having a portion thereof wound on the unwinder drum, a first plurality of rollers for moving the substrate through the floating unwinder, a first edge position sensor attached to the floating unwinder for lateral movement therewith, an infeed unit having a second plurality of rollers for moving the substrate through the infeed unit, a second edge position sensor attached to the infeed unit, the infeed unit being positionally fixed, an outfeed unit having a third plurality of rollers for moving the substrate through the outfeed unit, a third edge position sensor attached to the outfeed unit, the outfeed unit being positionally fixed, a floating rewinder including a rewinder drum and a rewinder linear actuator for moving the rewinder drum in the first lateral direction and the second lateral direction, a rewinder motor coupled to the rewinder drum to rotate the rewinder drum in the first rotational direction and the second rotational direction opposite the first rotational direction, the substrate wound on the rewinder drum, the floating rewinder including a fourth plurality of rollers for moving the substrate through the floating rewinder, a fourth edge position sensor attached to the floating rewinder for lateral movement therewith, an electronic controller including an electronic processor, a non-transitory storage media having instructions stored thereon and executable by the electronic processor, the electronic controller operatively connected to the unwinder linear actuator, the first edge position sensor, the second edge position sensor, the third edge position sensor, the fourth edge position sensor, the unwinder linear actuator, and the rewinder linear actuator; moving portions of the substrate from the floating unwinder to the floating rewinder wherein the substrate passes through the first edge position sensor and the second edge position sensor, wherein the electronic controller uses data from the second edge position sensor to determine a first location of the substrate as the substrate enters the infeed unit and sends a first command to the unwinder linear actuator to move the unwinder drum in the first lateral direction or the second lateral direction to adjust the substrate as the substrate enters the infeed unit, wherein the substrate passes through the outfeed unit and the third edge position sensor and the fourth edge position sensor, and wherein the electronic controller uses data from the fourth edge position sensor to determine a second location of the substrate as the substrate enters the floating rewinder, and wherein the electronic controller sends a second command to the rewinder linear actuator to move the rewinder drum in the first lateral direction or the second lateral direction so that the substrate is wound onto the rewinder drum at a predetermined location on the rewinder drum; moving the substrate from the floating rewinder to the floating unwinder wherein the substrate passes through the fourth edge position sensor and the third edge position sensor, wherein the electronic controller uses data from the third edge position sensor to determine a third location of the substrate as the substrate enters the outfeed unit and sends a third command to the rewinder linear actuator to move the rewinder drum in the first lateral direction or the second lateral direction to adjust the substrate as the substrate enters the outfeed unit, wherein the substrate passes through the infeed unit and the second edge position sensor and the first edge position sensor, and wherein the electronic controller uses data from the first edge position sensor to determine a fourth location of the substrate as the substrate enters the floating unwinder, and wherein the electronic controller sends a fourth command to the unwinder linear actuator to move the rewinder drum in the first lateral direction or the second lateral direction so that the substrate is wound onto the unwinder drum at a predetermined position on the unwinder drum.

A number of variations may include a method wherein the substrate includes a plurality of sample locations identified on the substrate in a first longitudinal direction so that the plurality of sample locations moves past a sensor while moving portions of the substrate from the floating unwinder to the floating rewinder.

A number of variations may include a method further including holding the sensor in a constant position relative to a first side edge and a second side edge of the substrate as the plurality of sample locations moves past the sensor.

A number of variations may include a method wherein the plurality of sample locations includes at least five sample locations.

A number of variations may include a method wherein the sensor is constructed and arranged to measure a thickness of the substrate.

A number of variations may include a method wherein the substrate includes a battery electrode material.

A number of variations may include a method wherein each sample location of the plurality of sample locations is identified by spaced apart pieces of tape or marks.

A number of variations may include a system including: a roll to roll machine including a floating unwinder including a unwinder drum and a unwinder linear actuator for moving the unwinder drum in a first lateral direction and a second lateral direction, an unwinder motor coupled to the unwinder drum to rotate the unwinder drum in a first rotational direction and a second rotational direction opposite the first rotational direction, a substrate having a portion thereof wound on the unwinder drum, a first plurality of rollers for moving the substrate through the floating unwinder, a first edge position sensor attached to the floating unwinder for lateral movement therewith, an infeed unit having a second plurality of rollers for moving the substrate through the infeed unit, a second edge position sensor attached to the infeed unit, the infeed unit being positionally fixed, an outfeed unit having a third plurality of rollers for moving the substrate through the outfeed unit, a third edge position sensor attached to the outfeed unit, the outfeed unit being positionally fixed, a floating rewinder including a rewinder drum and a rewinder linear actuator for moving the rewinder drum in the first lateral direction and the second lateral direction, a rewinder motor coupled to the rewinder drum to rotate the rewinder drum in the first rotational direction and the second rotational direction opposite the first rotational direction, the substrate wound on the rewinder drum, the floating rewinder including a fourth plurality of rollers for moving the substrate through the floating rewinder, a fourth edge position sensor attached to the floating rewinder for lateral movement therewith, an electronic controller including an electronic processor, a non-transitory storage media having instructions stored thereon and executable by the electronic processor, the electronic controller operatively connected to the unwinder linear actuator, the first edge position sensor, the second edge position sensor, the third edge position sensor, the fourth edge position sensor, the unwinder linear actuator, and the rewinder linear actuator; wherein the electronic controller is configured to carry out acts including: moving portions of the substrate from the floating unwinder to the floating rewinder wherein the substrate passes through the first edge position sensor and the second edge position sensor, wherein the electronic controller uses data from the second edge position sensor to determine a first location of the substrate as the substrate enters the infeed unit and sends a first command to the unwinder linear actuator to move the unwinder drum in the first lateral direction or the second lateral direction to adjust the substrate as the substrate enters the infeed unit, wherein the substrate passes through the outfeed unit and the third edge position sensor and the fourth edge position sensor, and wherein the electronic controller uses data from the fourth edge position sensor to determine a second location of the substrate as the substrate enters the floating rewinder, and wherein the electronic controller sends a second command to the rewinder linear actuator to move the rewinder drum in the first lateral direction or the second lateral direction so that the substrate is wound onto the rewinder drum at a predetermined location on the rewinder drum; moving the substrate from the floating rewinder to the floating unwinder wherein the substrate passes through the fourth edge position sensor and the third edge position sensor, wherein the electronic controller uses data from the third edge position sensor to determine a third location of the substrate as the substrate enters the outfeed unit and sends a third command to the rewinder linear actuator to move the rewinder drum in the first lateral direction or the second lateral direction to adjust the substrate as the substrate enters the outfeed unit, wherein the substrate passes through the infeed unit and the second edge position sensor and the first edge position sensor, and wherein the electronic controller uses data from the first edge position sensor to determine a fourth location of the substrate as the substrate enters the floating unwinder, and wherein the electronic controller sends a fourth command to the unwinder linear actuator to move the rewinder drum in the first lateral direction or the second lateral direction so that the substrate is wound onto the unwinder drum at a predetermined position on the unwinder drum.

A number of variations may include a system wherein the substrate includes a plurality of sample locations identified on the substrate in a first longitudinal direction so that the plurality of sample locations moves past a sensor while moving portions of the substrate from the floating unwinder to the floating rewinder.

A number of variations may include a system further including holding the sensor in a constant position relative to a first side edge and a second side edge of the substrate as the plurality of sample locations moves past the sensor.

A number of variations may include a system wherein the substrate includes a battery electrode material.

A number of variations may include a system wherein the substrate includes a metal foil.

BRIEF DESCRIPTION OF THE DRAWINGS

The illustrative variations will hereinafter be described in conjunction with the following drawing figures, wherein like numerals denote like elements, and wherein.

DETAILED DESCRIPTION

The following detailed description is merely illustrative in nature and is not intended to limit the application and uses. Furthermore, there is no intention to be bound by any expressed or implied theory presented in the preceding introduction, brief description of the drawings, brief summary or the following detailed description.

Figure 1:
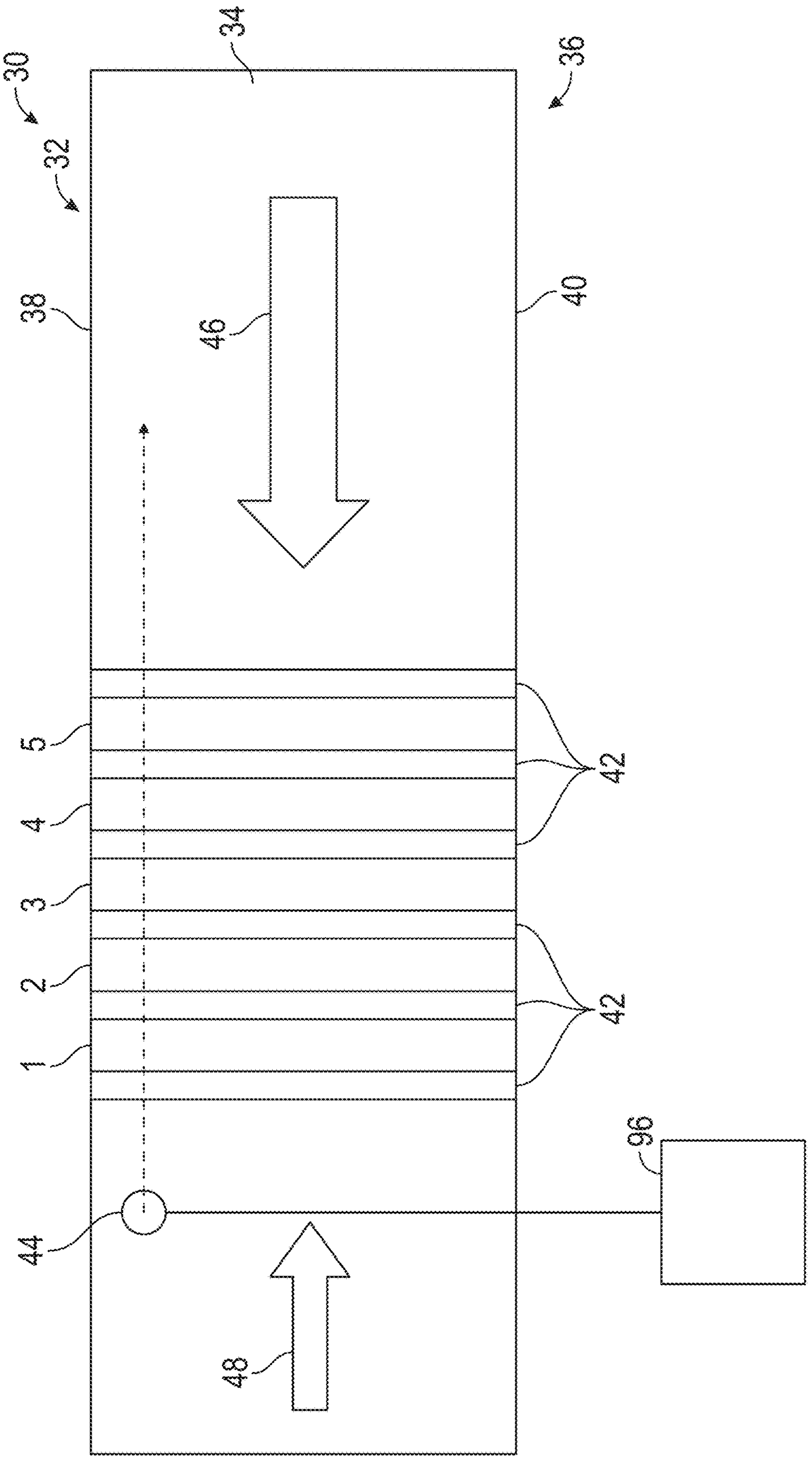
FIG. 1 is a schematic illustration of a substrate having a plurality of sample locations which may be identified by a tape or marker according to a number of variations.

Referring to FIG. 1, a product 30 may include a substrate 32 having a plurality of sample locations 1, 2, 3, 4, 5 wherein each one of the plurality of sample locations 1, 2, 3, 4, 5 may be identified by a variety of ways, including but not limited to, using a pair of spaced apart pieces tape or marker 42. The substrate 32 may be generally flat and may have a first face 34 and a second face 36. The substrate 32 may have a first side edge 38 and a second side edge 40 which is opposite the first side edge 38. The substrate 32 may be moved in a first longitudinal direction 46 or a second longitudinal direction 48 which is opposite the first longitudinal direction 46. A sensor 44 may be used to determine a property of the substrate 32 and may be held in a constant position with respect to the first side edge 38 and the second side edge 40, for example, when the substrate 32 is moved in the first longitudinal direction 46. In a number of variations, the sensor 44 may be a property sensor which may be a thickness gauge constructed and arranged to measure the thickness of the substrate 32 at each of the sample locations 1, 2, 3, 4, 5. Data may be collected from the sensor 44 using an electronic controller 96 for multiple passes of the substrate 32 moving in the first longitudinal direction 46. For example, the substrate 32 may be moved in the first longitudinal direction 46 so that each sample locations 1, 2, 3, 4, 5 moves past the sensor 44. Thereafter, the substrate 32 may be moved in the second longitudinal direction 48 so that each of the sample locations moves back past the sensor 44. Thereafter, the process may be repeated several times. For example, to collect fifty substrate thickness measurements the process may be repeated nine times. Repeating the process to collect fifty thickness measures may be used to verify a Type 3 gauge repeatability and reproducibility testing standard/requirement. Any of a variety of thickness measurement sensors known to those skilled in the art may be utilized to measure the thickness of the substrate. A thickness measurement sensor typically works by measuring the distance between two surfaces of a material using a method like laser triangulation, where a laser beam is projected onto the surface, and the reflected light is analyzed to determine the distance, with the thickness calculated by subtracting the distance to the top surface from the distance to the bottom surface, often utilizing two sensors positioned on opposite sides of the material to achieve this measurement; other methods include capacitive sensing, where the change in capacitance between the sensors and the material is proportional to the thickness, or ultrasonic waves, where the time it takes for an ultrasonic pulse to travel through the material is used to calculate the thickness.

Figure 2:
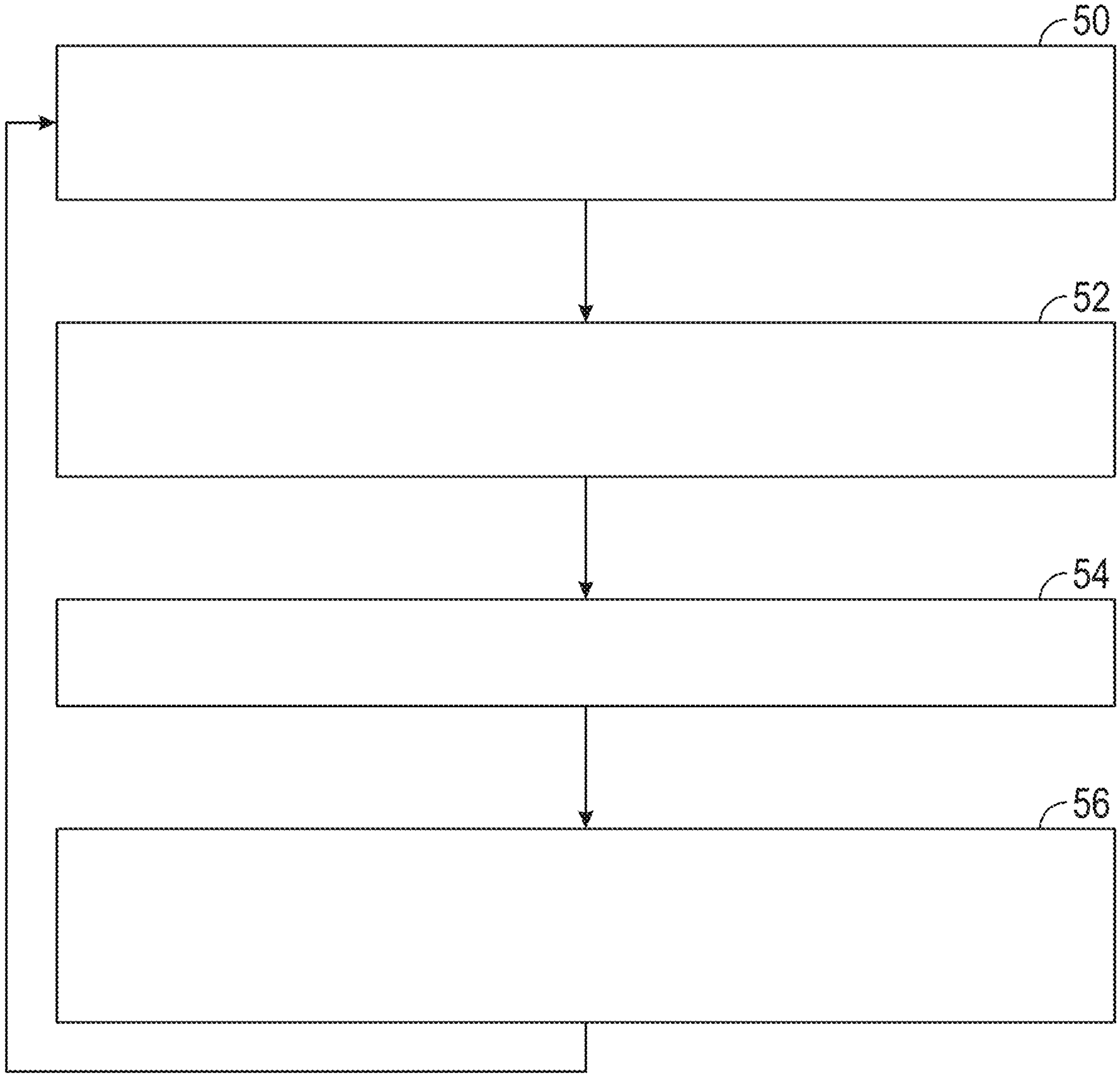
FIG. 2 is a flow diagram of a method which may include sensing a plurality of marked locations on a substrate according to a number of variations.

Referring to FIG. 2, a method may include a first act 50 may include moving a substrate having a plurality of sample locations identified or marked on the substrate in a first longitudinal direction so that the plurality of sample locations moves past a sensor. A second act 52 may include holding the sensor position constant relative to the first side edge and a second side edge of the substrate as the plurality of sample locations moves past the sensor. A third act may include using the sensor to collect data regarding a property of the substrate at each sample location of the plurality of sample locations. A fourth act may include moving the substrate having a plurality of sample locations marked on the substrate in a second longitudinal direction opposite the first direction so that the plurality of sample locations move back past the sensor. Thereafter, the first act 50, the second act 52, the third act 54, and the fifth act 56 may be repeated in order numerous times. As the substrate 32 is moved in the first longitudinal direction 46 the substrate may also move in a first lateral direction or a second lateral direction opposite the first lateral direction. The sensor 44 is held at a constant position with respect to the first side edge 38 and the second side edge 40 of the substrate. As such, the sensor 44 may be positioned to move with the substrate 32 in the event of the substrate moves in the first lateral direction or the second lateral direction.

Figure 3:
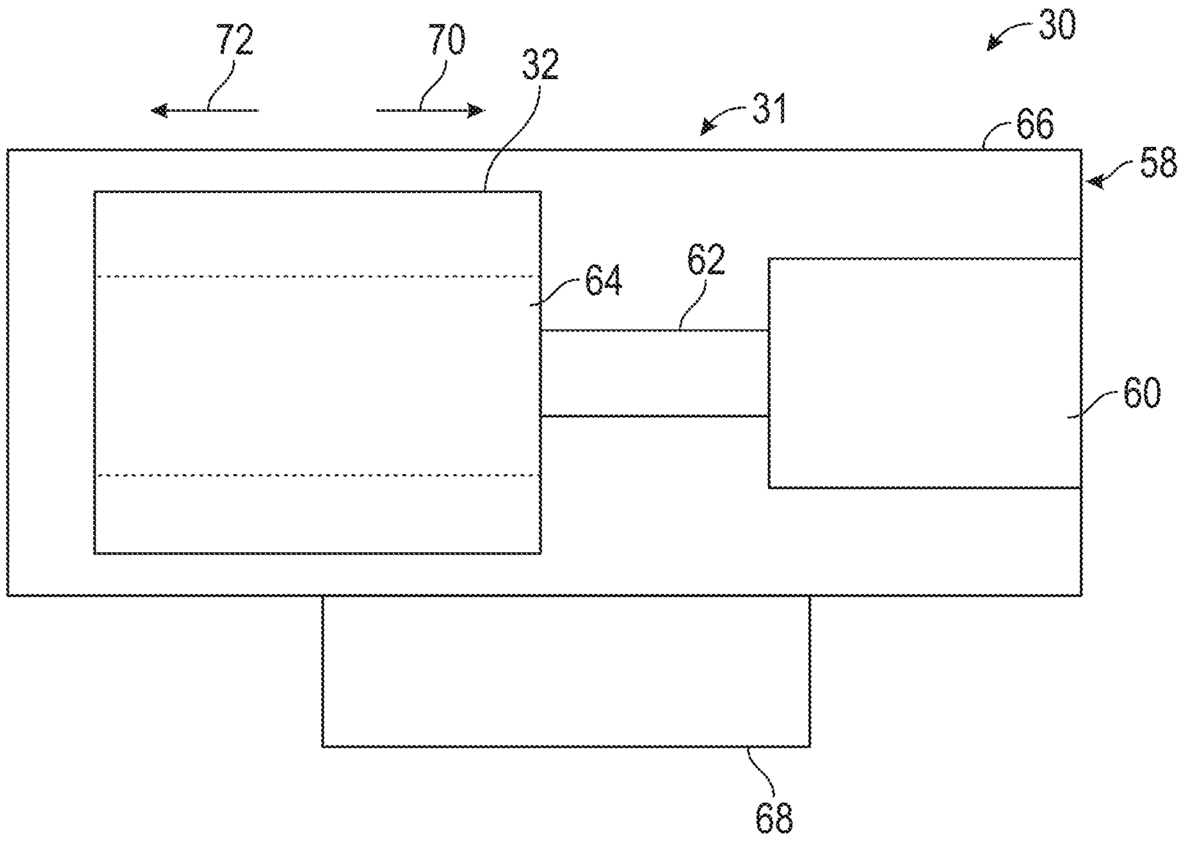
FIG. 3 is a schematic illustration of a portion of a roll to roll machine including a floating unwinder or floating rewinder according to a number of variations.

Referring now to FIG. 3, a product 30, which may be a roll to roll machine, may include floating unwinder 58, which may include a motor 60 having a shaft 62 rotatably driven by the motor 60. The shaft 62 may be coupled to an unwinder drum 64 on which the substrate 32 may be wound or unwound. An unwinder linear actuator 68 may be coupled to the housing 66 so that the unwinder drum 64 may move in a first lateral direction 70 and a second lateral direction 72 which is opposite the first lateral direction 70. The unwinder linear actuator 68 may be of any type known to those skilled in the art, including but not limited to, a rack and pinion linear actuator or a ball screw linear actuator. Alternatively, the unwinder linear actuator 68 may be located to move at least one of the unwinder drum 64 or shaft 62. The floating unwinder may be constructed so that the at least the unwinder drum 64 may move in the first lateral direction 70 and a second lateral direction 72 in response to data collected from edge position sensors measuring the location of at least one of the first side edge 38 or second side edge 40 of the substrate 32 (shown in FIGS. 6-7). During testing or operation of a roll to roll machine 31, the substrate 32 may move laterally which would result in the substrate 32 being rolled onto unwinder drum 64 in a telescoping manner, which is undesirable. Data from the edge position sensors may be utilized by an electronic controller to send commands to the unwinder linear actuator 68 to move the unwinder drum in a first lateral position or a second lateral position so that the substrate 32 is properly wound on the unwinder drum 64, and not in a telescoping manner. Furthermore, the unwinder linear actuator 68 may be utilized to place the substrate 32 in the proper location for processing equipment to do work on the substrate 32, which may include, but is not limited to, pressing the substrate 32 to a thickness within a predetermined range.

Figure 4:
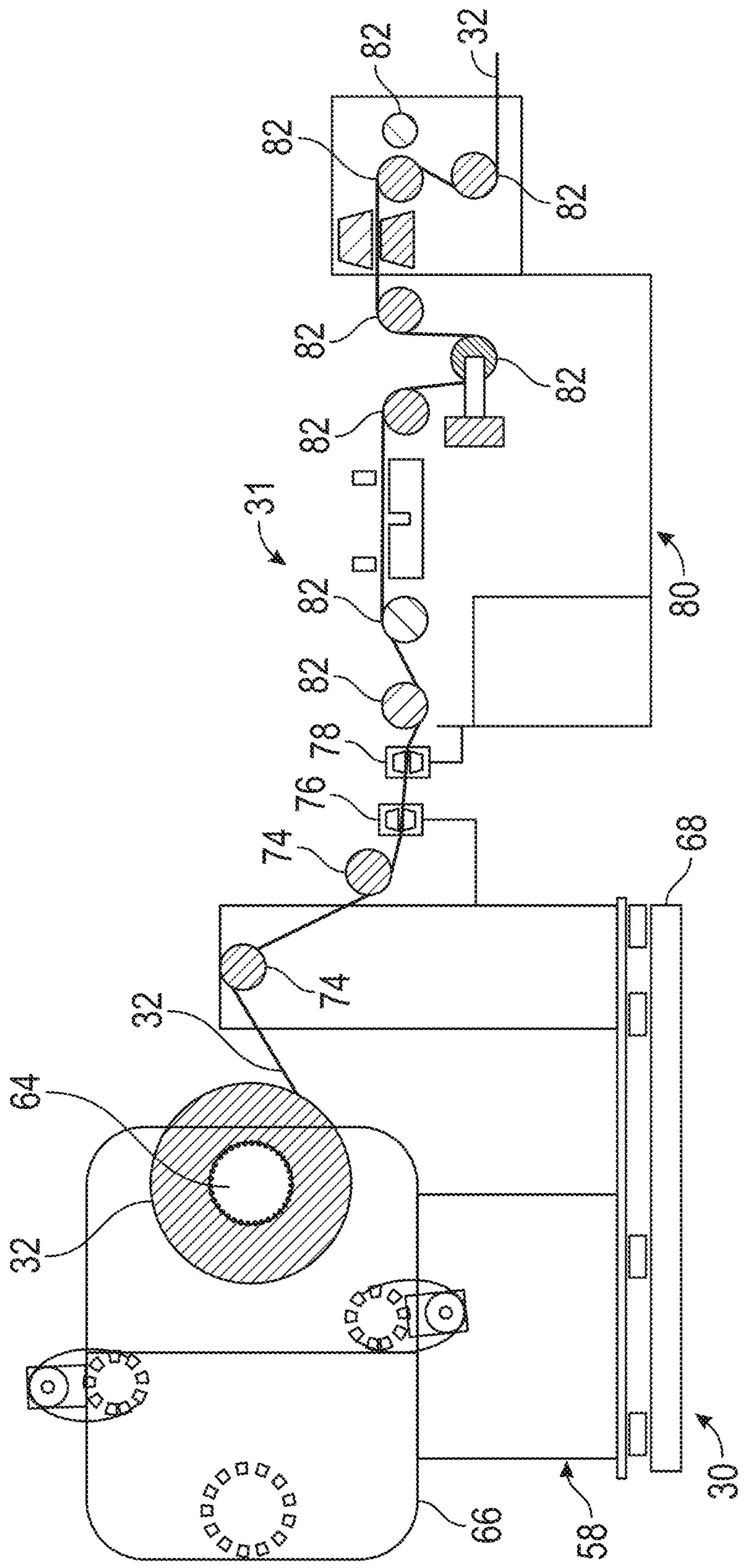
FIG. 4 is a schematic illustration of a portion of roll to roll machine including unwinder and an infeed unit according to a number of variations.

FIG. 4 illustrates portions of a roll to roll machine 31 including a floating unwinder 58 and an infeed unit 80. The floating unwinder 58 may include a motor and shaft (best seen in FIG. 3), an unwinder drum 64 with the substrate 32 wound thereon. The floating unwinder 58 may include a housing 66 and an unwinder linear actuator 68 connected thereto. The floating unwinder 58 may include a first plurality of rollers 74 for directing the flow of the substrate 32 as it is unwound or wound onto the unwinder drum 64 of the floating unwinder 58. A first edge position sensor 76 is attached to the floating unwinder 58 and moves laterally with the floating unwinder 58. The first edge position sensor 76 is positioned along the first side edge 38 or second side edge 40 (best seen in FIG. 3.) of the substrate 32. The infeed unit 80 may include a second plurality of rollers 82 to guide the substrate 32. A second edge position sensor 78 may be connected to the infeed unit 80. The infeed unit 80 is or may be fixed to the floor. The edge position sensor 78 and the infeed unit 80 are fixed together and are not expected to move relative to each other. Both the first edge position sensor 76 and the second edge position sensor 78 may be positioned along the first side edge 38 or second side edge 40 (best seen in FIG. 3.) of the substrate 32. The first edge position sensor 76 and the second edge position sensor 78 are positioned between the floating unwinder 58 and the infeed unit 80 with the first edge position sensor 76 closer to the floating rewinder than the second edge position sensor 78.

Figure 5:
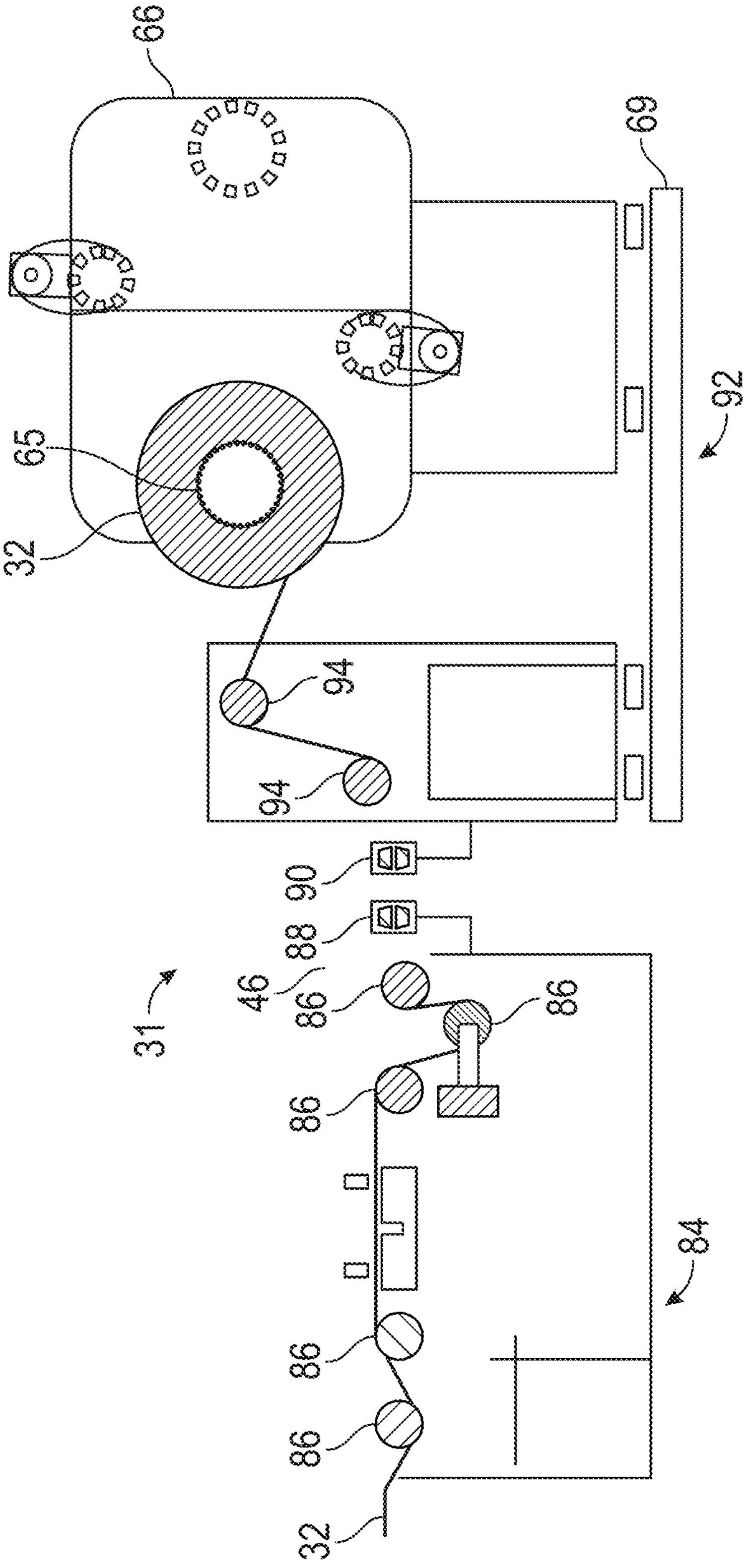
FIG. 5 is a schematic illustration of a portion of a roll to roll machine including a floating rewinder and an outlet unit according to a number of variations.

FIG. 5 illustrates portions of a roll to roll machine 31 including an outfeed unit 84 and a floating rewinder 92. The outfeed unit 84 may include a third plurality of rollers 86 to guide the substrate 32. The outfeed unit 88 is or may be fixed to the floor. A third edge position sensor 88 and the outfeed unit 84 are fixed together and are not expected to move relative to each other. The floating rewinder 92 may be similarly constructed as the floating unwinder 58. The floating rewinder 92 may include a motor 60 and shaft 62 (best seen in FIG. 3), and a rewinder drum 65 with the substrate 32 wound thereon. The floating rewinder 92 may include a housing 66 and a rewinder linear actuator 69 connected thereto. The floating rewinder 92 may include a fourth plurality of rollers 94 for directing the flow of the substrate 32 as the substrate 32 is unwound or wound onto the rewinder drum 65 of the floating rewinder 92. A fourth edge position sensor 90 is attached to the floating rewinder 92 and moves laterally with the floating rewinder 92. Both the third edge position sensor 88 and the fourth edge position sensor 90 may be positioned along the first side edge 38 or second side edge 40 (best seen in FIG. 3). The third edge position sensor 88 and the fourth edge position sensor 90 may be positioned between the floating rewinder 92 and the outfeed unit 84 with the fourth edge position sensor 90 closer to the floating rewinder 92 than the third edge position sensor 88.

Figure 6:
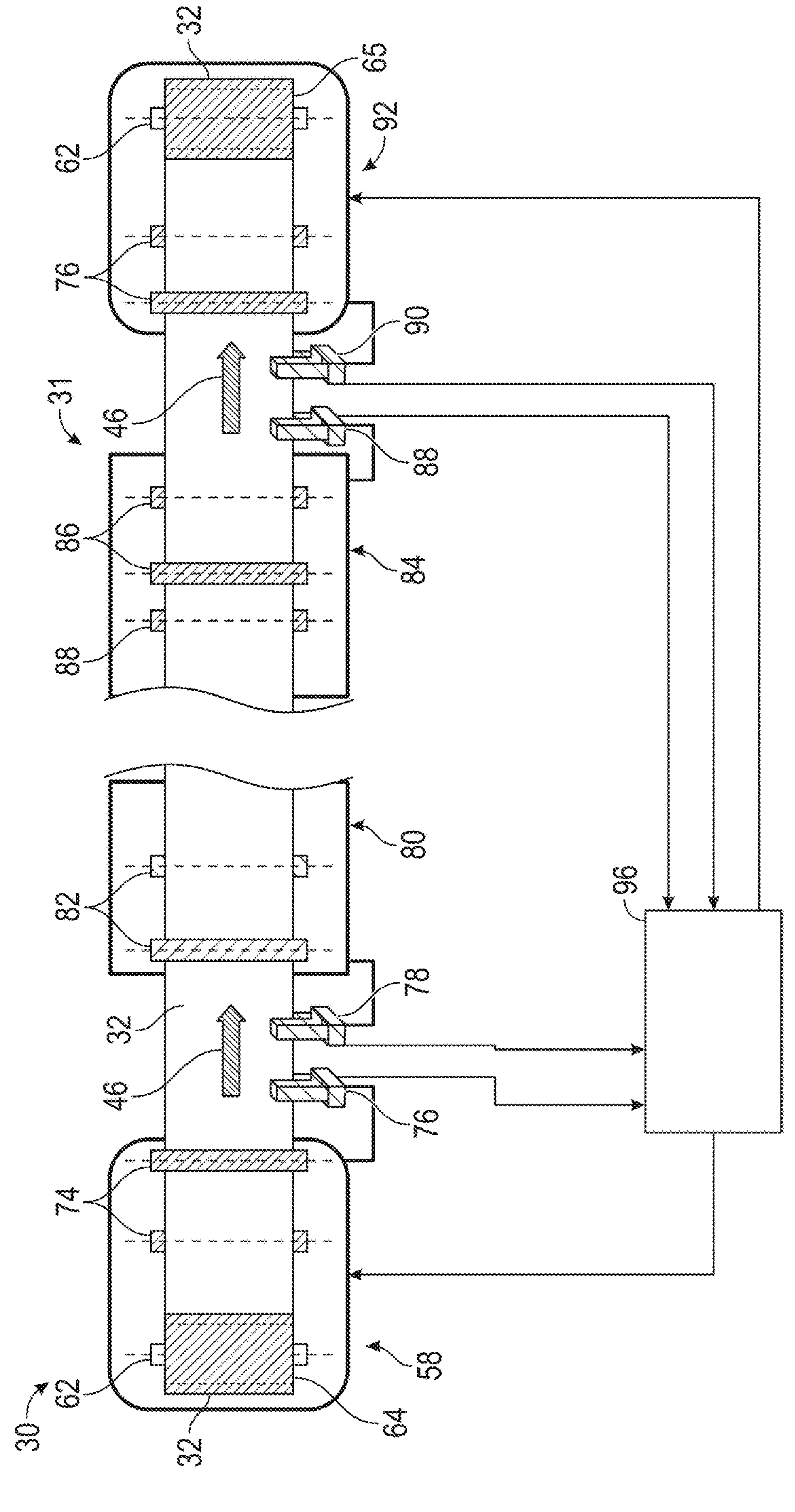
FIG. 6 is a schematic illustration of a roll to roll machine being operated in a forward direction wherein substrate moves from a floating unwinder to a floating rewinder according to a number of variations.

Referring to FIG. 6, the product 30 which may be a roll to roll machine, may be operated so that the substrate 32 is moved in a first longitudinal direction 46 from the floating unwinder 58 toward the floating rewinder 92. When the substrate 32 is moving in the first longitudinal direction 46 the second edge position sensor 78 attached to the infeed unit 80 is used to measure the location of the substrate 32 prior to the infeed unit 80. Data from the first edge position sensor 76 may not be utilized when the substrate is being unwound from the floating unwinder 58. The substrate 32 moves past the second edge position sensor 78 through the infeed unit 80 and into the outfeed unit 84 and thereafter past the third edge position sensor 88. Data from the third edge position sensor 88 may not be utilized when the substrate is moving in the first longitudinal direction 46. The substrate 32 moves from the third edge position sensor 88 past the fourth edge position sensor 90. Data from the fourth edge position sensor is utilized to cause the rewinder linear actuator 69 of the floating rewinder 92 to move in a lateral direction to properly wind the substrate 32 onto the rewinder drum 65 of the floating rewinder 92 and avoid winding the substrate 32 in a telescoping manner.

Figure 7:
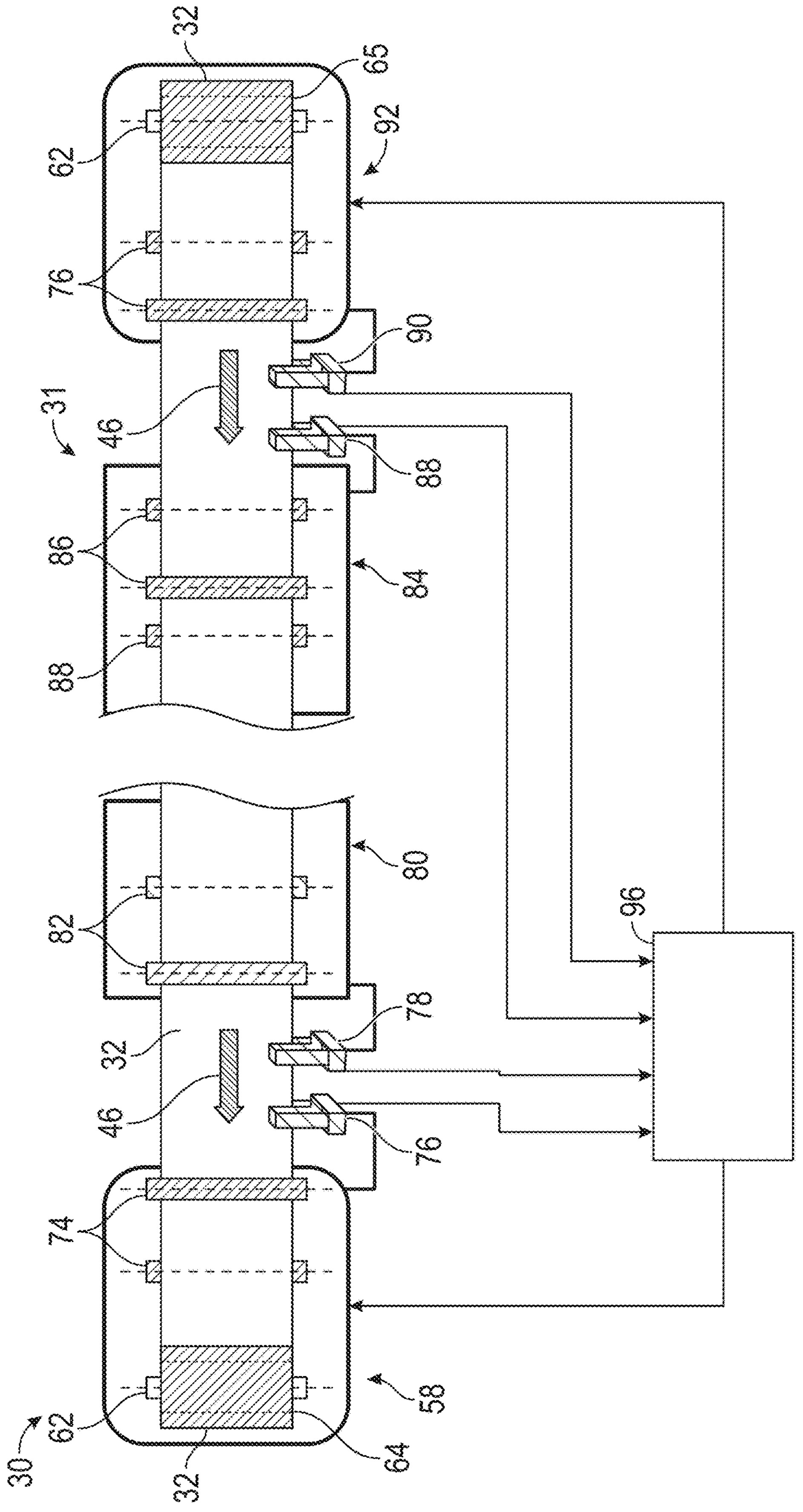
FIG. 7 is a schematic illustration of a roll to roll machine being operated in a reverse direction wherein substrate moves from a floating rewinder to a floating unwinder according to a number of variations.

Referring to FIG. 7, the substrate 32 may be moved in a second longitudinal direction 48 from the floating rewinder 92 to the floating unwinder 58. The substrate 32 moves from the floating rewinder 92 through the fourth edge position sensor 90 and through the third edge position sensor 88. Data may not be used from the fourth edge position sensor 90 with the substrate 32 is moving in the second longitudinal direction 48. Data from the third edge position sensor 88 is collected and utilized to determine the location of the substrate 32 as it enters the outfeed unit 84. From the outfeed unit 84 the substrate 32 moves into the infeed unit 80. The substrate 32 moves from the infeed unit 80 through the second edge position sensor 78 and through the first edge position sensor 76. Data from the second edge position sensor 78 may not be collected when the substrate is moving and the second longitudinal direction 48. Data from the first edge position sensor 76 is utilized to cause the linear actuator of the floating unwinder 58 to move the drum and a lateral direction so that the substrate 32 is wound onto the unwinder drum 64 in a proper aligned manner and to avoid winding the substrate 32 onto the unwinder drum 64 of the floating unwinder 58 in telescoping manner.

Figure 8:
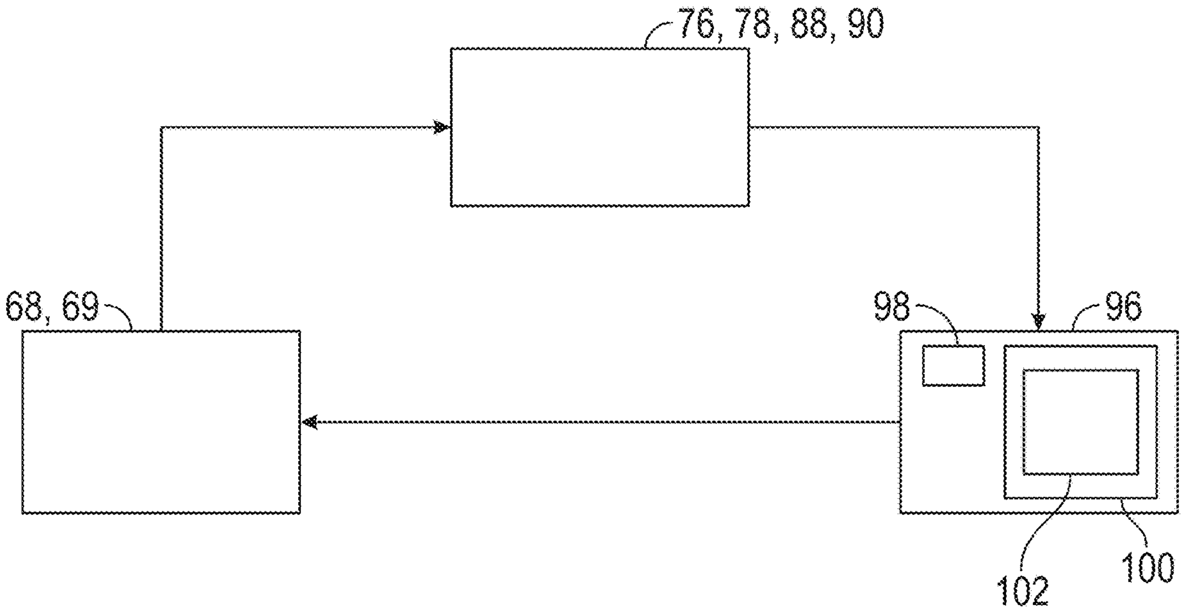
FIG. 8 is a schematic illustration of a feed loop including an edge position sensor providing data to an electronic controller which may send a command to a lateral actuator according to a number of variations.

Referring to FIG. 8, the first edge position sensor 76, the second edge position sensor 78, the third edge position sensor 88 and the fourth edge position sensor 90 may be operatively connected so that data may be transferred to an electronic controller 96 and commands may be sent to the unwinder linear actuator 68 of the floating unwinder 58 or rewinder linear actuator 69 of the floating rewinder 92 (best seen in FIGS. 6-7). An electronic controller 96 may include electronic processor 98 and a non-transitory computer-readable media 100 having instructions 102 stored thereon executable by the electronic processor 98 to carry out any of the acts or methods disclosed herein.

Figure 9A:
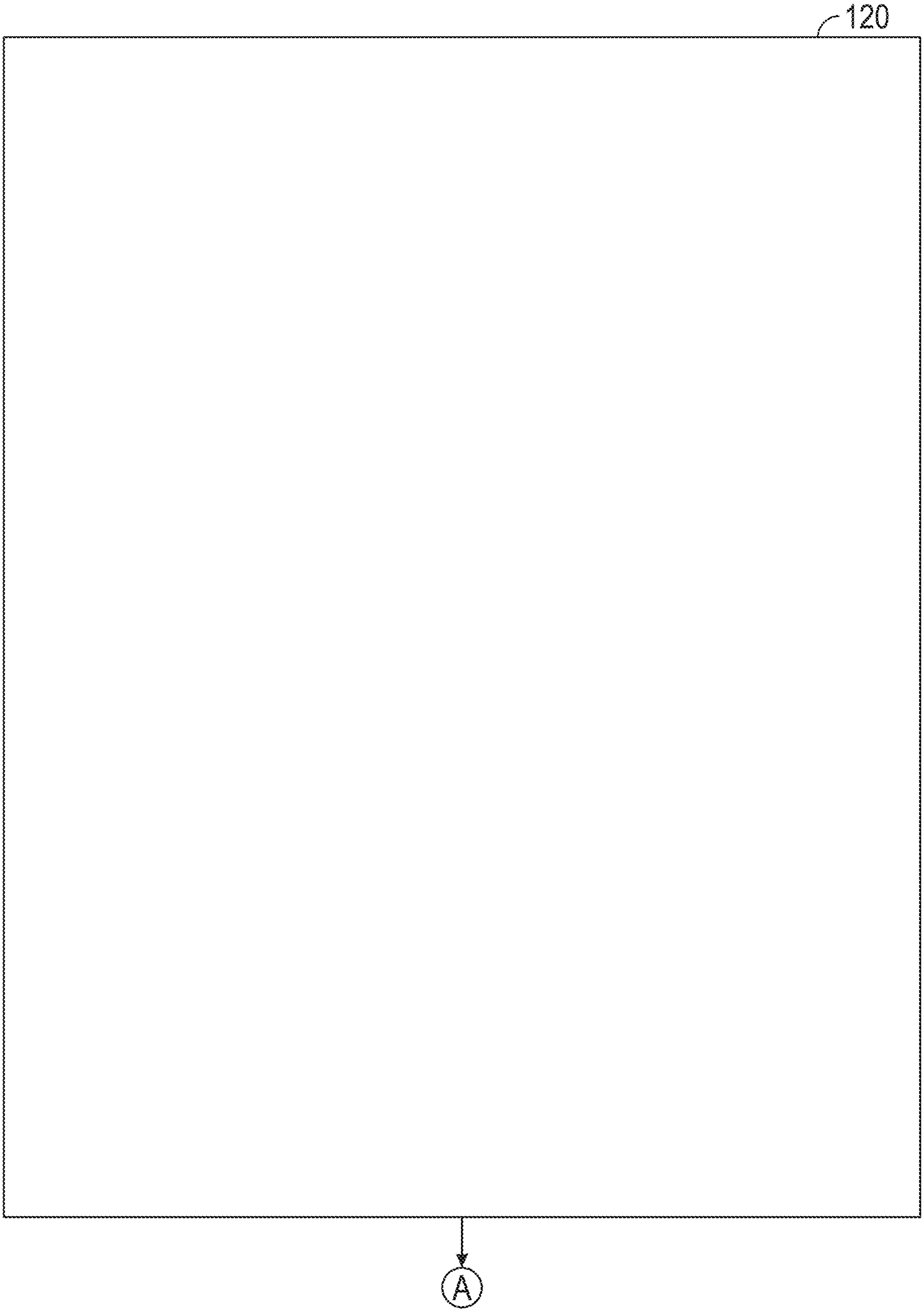
FIGS. 9A and 9B illustrate a flow diagram of a method which may include sensing a plurality of marked locations on a substrate according to a number of variations.
Figure 9B:
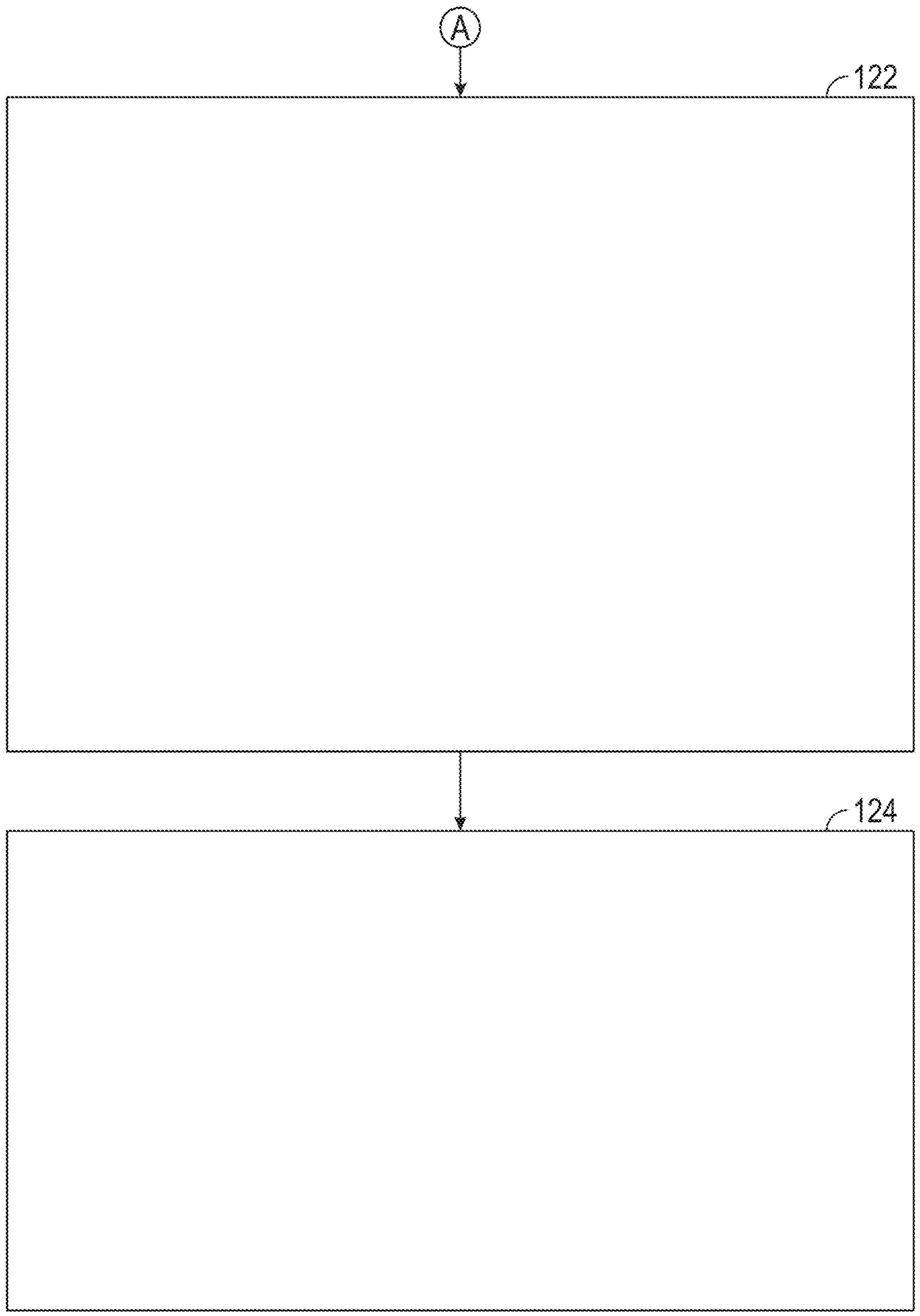

FIGS. 9A and 9B illustrate a flow diagram of a method the may include providing act 120: providing a roll to roll machine comprising a floating unwinder comprising a unwinder drum and a unwinder linear actuator for moving the unwinder drum in a first lateral direction and a second lateral direction, an unwinder motor coupled to the unwinder drum to rotate the unwinder drum in a first rotational direction and a second rotational direction opposite the first rotational direction, a substrate having a portion thereof wound on the unwinder drum, a first plurality of rollers for moving the substrate through the floating unwinder, a first edge position sensor attached to the floating unwinder for lateral movement therewith, an infeed unit having a second plurality of rollers for moving the substrate through the infeed unit, a second edge position sensor attached to the infeed unit, the infeed unit being positionally fixed, an outfeed unit having a third plurality of rollers for moving the substrate through the outfeed unit, a third edge position sensor attached to the outfeed unit, the outfeed unit being positionally fixed, a floating rewinder comprising a rewinder drum and a rewinder linear actuator for moving the rewinder drum in the first lateral direction and the second lateral direction, a rewinder motor coupled to the rewinder drum to rotate the rewinder drum in the first rotational direction and the second rotational direction opposite the first rotational direction, the substrate wound on the rewinder drum, the floating rewinder including a fourth plurality of rollers for moving the substrate through the floating rewinder, a fourth edge position sensor attached to the floating rewinder for lateral movement therewith, an electronic controller comprising an electronic processor, a non-transitory storage media having instructions stored thereon and executable by the electronic processor, the electronic controller operatively connected to the unwinder linear actuator, the first edge position sensor, the second edge position sensor, the third edge position sensor, the fourth edge position sensor, the unwinder linear actuator, and the rewinder linear actuator. Act 122: moving portions of the substrate from the floating unwinder to the floating rewinder wherein the substrate passes through the first edge position sensor and the second edge position sensor, wherein the electronic controller uses data from the second edge position sensor to determine a first location of the substrate as the substrate enters the infeed unit and sends a first command to the unwinder linear actuator to move the unwinder drum in the first lateral direction or the second lateral direction to adjust the substrate as the substrate enters the infeed unit, wherein the substrate passes through the outfeed unit and the third edge position sensor and the fourth edge position sensor, and wherein the electronic controller uses data from the fourth edge position sensor to determine a second location of the substrate as the substrate enters the floating rewinder, and wherein the electronic controller sends a second command to the rewinder linear actuator to move the rewinder drum in the first lateral direction or the second lateral direction so that the substrate is wound onto the rewinder drum at a predetermined location on the rewinder drum. And act 124: moving the substrate from the floating rewinder to the floating unwinder wherein the substrate passes through the fourth edge position sensor and the third edge position sensor, wherein the electronic controller uses data from the third edge position sensor to determine a third location of the substrate as the substrate enters the outfeed unit and sends a third command to the rewinder linear actuator to move the rewinder drum in the first lateral direction or the second lateral direction to adjust the substrate as the substrate enters the outfeed unit, wherein the substrate passes through the infeed unit and the second edge position sensor and the first edge position sensor, and wherein the electronic controller uses data from the first edge position sensor to determine a fourth location of the substrate as the substrate enters the floating unwinder, and wherein the electronic controller sends a fourth command to the unwinder linear actuator to move the rewinder drum in the first lateral direction or the second lateral direction so that the substrate is wound onto the unwinder drum at a predetermined position on the unwinder drum.

While at least one variation has been presented in the foregoing detailed description, it should be appreciated that a vast number of variations exist. It should also be appreciated that the variation or variations are only examples, and are not intended to limit the scope, applicability, or configuration of the disclosure in any way. Rather, the foregoing detailed description will provide those skilled in the art with a convenient road map for implementing the illustrative variation or variations. It should be understood that various changes can be made in the function and arrangement of elements without departing from the scope of the disclosure as set forth in the appended claims and the legal equivalents thereof.

What is claimed is:

1. A method comprising:

providing a roll to roll machine comprising a floating unwinder comprising a unwinder drum and a unwinder linear actuator for moving the unwinder drum in a first lateral direction and a second lateral direction, an unwinder motor coupled to the unwinder drum to rotate the unwinder drum in a first rotational direction and a second rotational direction opposite the first rotational direction, a substrate having a portion thereof wound on the unwinder drum, a first plurality of rollers for moving the substrate through the floating unwinder, a first edge position sensor attached to the floating unwinder for lateral movement therewith, an infeed unit having a second plurality of rollers for moving the substrate through the infeed unit, a second edge position sensor attached to the infeed unit, the infeed unit being positionally fixed, an outfeed unit having a third plurality of rollers for moving the substrate through the outfeed unit;

(a) moving a substrate having a plurality of sample locations identified on the substrate in a first longitudinal direction along the roll to roll machine so that each sample location of the plurality of sample locations moves past the first sensor;

(b) holding the first sensor in a constant position relative to a first side edge and a second side edge of the substrate as the plurality of sample locations moves past the first sensor;

(c) using the first sensor to collect data regarding a property of the substrate at each sample location;

d) moving the substrate having the plurality of sample locations identified on the substrate in a second longitudinal direction opposite the first longitudinal direction so that each sample location of the plurality of sample locations move back past the first sensor; and (e) repeating acts (a-d).

2. The method as set forth in claim 1 wherein the plurality of sample locations comprises at least five sample locations.

3. The method as set forth in claim 1 wherein repeating acts (a-d) a plurality of times comprises repeating acts (a-d) eight times to collect fifty data regarding the property of the substrate.

4. The method as set forth in claim 1 wherein the sensor is constructed and arranged to measure a thickness of the substrate.

5. The method as set forth in claim 4 wherein the substrate comprises a battery electrode material.

6. The method as set forth in claim 5 wherein the battery electrode material comprises a metal foil.

7. The method as set forth in claim 1 wherein each sample location of the plurality of sample locations is identified by spaced apart pieces of tape or marks.

8. The method as set forth in claim 1 further comprising moving the substrate laterally as the substrate is moving in the first longitudinal direction.

9. A method comprising:

providing a roll to roll machine comprising a floating unwinder comprising a unwinder drum and a unwinder linear actuator for moving the unwinder drum in a first lateral direction and a second lateral direction, an unwinder motor coupled to the unwinder drum to rotate the unwinder drum in a first rotational direction and a second rotational direction opposite the first rotational direction, a substrate having a portion thereof wound on the unwinder drum, a first plurality of rollers for moving the substrate through the floating unwinder, a first edge position sensor attached to the floating unwinder for lateral movement therewith, an infeed unit having a second plurality of rollers for moving the substrate through the infeed unit, a second edge position sensor attached to the infeed unit, the infeed unit being positionally fixed, an outfeed unit having a third plurality of rollers for moving the substrate through the outfeed unit, a third edge position sensor attached to the outfeed unit, the outfeed unit being positionally fixed, a floating rewinder comprising a rewinder drum and a rewinder linear actuator for moving the rewinder drum in the first lateral direction and the second lateral direction, a rewinder motor coupled to the rewinder drum to rotate the rewinder drum in the first rotational direction and the second rotational direction opposite the first rotational direction, the substrate wound on the rewinder drum, the floating rewinder including a fourth plurality of rollers for moving the substrate through the floating rewinder, a fourth edge position sensor attached to the floating rewinder for lateral movement therewith, an electronic controller comprising an electronic processor, a non-transitory storage media having instructions stored thereon and executable by the electronic processor, the electronic controller operatively connected to the unwinder linear actuator, the first edge position sensor, the second edge position sensor, the third edge position sensor, the fourth edge position sensor, the unwinder linear actuator, and the rewinder linear actuator;

moving portions of the substrate from the floating unwinder to the floating rewinder wherein the substrate passes through the first edge position sensor and the second edge position sensor, wherein the electronic controller uses data from the second edge position sensor to determine a first location of the substrate as the substrate enters the infeed unit and sends a first command to the unwinder linear actuator to move the unwinder drum in the first lateral direction or the second lateral direction to adjust the substrate as the substrate enters the infeed unit, wherein the substrate passes through the outfeed unit and the third edge position sensor and the fourth edge position sensor, and wherein the electronic controller uses data from the fourth edge position sensor to determine a second location of the substrate as the substrate enters the floating rewinder, and wherein the electronic controller sends a second command to the rewinder linear actuator to move the rewinder drum in the first lateral direction or the second lateral direction so that the substrate is wound onto the rewinder drum at a predetermined location on the rewinder drum; and moving the substrate from the floating rewinder to the floating unwinder wherein the substrate passes through the fourth edge position sensor and the third edge position sensor, wherein the electronic controller uses data from the third edge position sensor to determine a third location of the substrate as the substrate enters the outfeed unit and sends a third command to the rewinder linear actuator to move the rewinder drum in the first lateral direction or the second lateral direction to adjust the substrate as the substrate enters the outfeed unit, wherein the substrate passes through the infeed unit and the second edge position sensor and the first edge position sensor, and wherein the electronic controller uses data from the first edge position sensor to determine a fourth location of the substrate as the substrate enters the floating unwinder, and wherein the electronic controller sends a fourth command to the unwinder linear actuator to move the rewinder drum in the first lateral direction or the second lateral direction so that the substrate is wound onto the unwinder drum at a predetermined position on the unwinder drum.

10. The method as set forth in claim 9 wherein the substrate comprises a plurality of sample locations identified on the substrate in a first longitudinal direction so that the plurality of sample locations moves past a sensor while moving portions of the substrate from the floating unwinder to the floating rewinder.

11. The method as set forth in claim 10 further comprising holding the sensor in a constant position relative to a first side edge and a second side edge of the substrate as the plurality of sample locations moves past the sensor.

12. The method as set forth in claim 10 wherein the plurality of sample locations comprises at least five sample locations.

13. The method as set forth in claim 10 wherein the sensor is constructed and arranged to measure a thickness of the substrate.

14. The method as set forth in claim 10 wherein each sample location of the plurality of sample locations is identified by spaced apart pieces of tape or marks.

15. The method as set forth in claim 9 wherein the substrate comprises a battery electrode material.

16. A system comprising:

a roll to roll machine comprising a floating unwinder comprising a unwinder drum and a unwinder linear actuator for moving the unwinder drum in a first lateral direction and a second lateral direction, an unwinder motor coupled to the unwinder drum to rotate the unwinder drum in a first rotational direction and a second rotational direction opposite the first rotational direction, a substrate having a portion thereof wound on the unwinder drum, a first plurality of rollers for moving the substrate through the floating unwinder, a first edge position sensor attached to the floating unwinder for lateral movement therewith, an infeed unit having a second plurality of rollers for moving the substrate through the infeed unit, a second edge position sensor attached to the infeed unit, the infeed unit being positionally fixed, an outfeed unit having a third plurality of rollers for moving the substrate through the outfeed unit, a third edge position sensor attached to the outfeed unit, the outfeed unit being positionally fixed, a floating rewinder comprising a rewinder drum and a rewinder linear actuator for moving the rewinder drum in the first lateral direction and the second lateral direction, a rewinder motor coupled to the rewinder drum to rotate the rewinder drum in the first rotational direction and the second rotational direction opposite the first rotational direction, the substrate wound on the rewinder drum, the floating rewinder including a fourth plurality of rollers for moving the substrate through the floating rewinder, a fourth edge position sensor attached to the floating rewinder for lateral movement therewith, an electronic controller comprising an electronic processor, a non-transitory storage media having instructions stored thereon and executable by the electronic processor, the electronic controller operatively connected to the unwinder linear actuator, the first edge position sensor, the second edge position sensor, the third edge position sensor, the fourth edge position sensor, the unwinder linear actuator, and the rewinder linear actuator;

wherein the electronic controller is configured to carry out acts comprising:

moving portions of the substrate from the floating unwinder to the floating rewinder wherein the substrate passes through the first edge position sensor and the second edge position sensor, wherein the electronic controller uses data from the second edge position sensor to determine a first location of the substrate as the substrate enters the infeed unit and sends a first command to the unwinder linear actuator to move the unwinder drum in the first lateral direction or the second lateral direction to adjust the substrate as the substrate enters the infeed unit, wherein the substrate passes through the outfeed unit and the third edge position sensor and the fourth edge position sensor, and wherein the electronic controller uses data from the fourth edge position sensor to determine a second location of the substrate as the substrate enters the floating rewinder, and wherein the electronic controller sends a second command to the rewinder linear actuator to move the rewinder drum in the first lateral direction or the second lateral direction so that the substrate is wound onto the rewinder drum at a predetermined location on the rewinder drum; and moving the substrate from the floating rewinder to the floating unwinder wherein the substrate passes through the fourth edge position sensor and the third edge position sensor, wherein the electronic controller uses data from the third edge position sensor to determine a third location of the substrate as the substrate enters the outfeed unit and sends a third command to the rewinder linear actuator to move the rewinder drum in the first lateral direction or the second lateral direction to adjust the substrate as the substrate enters the outfeed unit, wherein the substrate passes through the infeed unit and the second edge position sensor and the first edge position sensor, and wherein the electronic controller uses data from the first edge position sensor to determine a fourth location of the substrate as the substrate enters the floating unwinder, and wherein the electronic controller sends a fourth command to the unwinder linear actuator to move the rewinder drum in the first lateral direction or the second lateral direction so that the substrate is wound onto the unwinder drum at a predetermined position on the unwinder drum.

17. The system as set forth in claim 16 wherein the substrate comprises a plurality of sample locations identified on the substrate in a first longitudinal direction so that the plurality of sample locations moves past a sensor while moving portions of the substrate from the floating unwinder to the floating rewinder.

18. The system as set forth in claim 17 further comprising holding the sensor in a constant position relative to a first side edge and a second side edge of the substrate as the plurality of sample locations moves past the sensor.

19. The system as set forth in claim 17 wherein the substrate comprises a battery electrode material.

20. The system as set forth in claim 17 wherein the substrate comprises a metal foil.

* * * * *